(12) United States Patent
Endo et al.

(10) Patent No.: US 7,082,225 B2
(45) Date of Patent: Jul. 25, 2006

(54) TWO DIMENSIONAL IMAGE RECORDING AND REPRODUCING SCHEME USING SIMILARITY DISTRIBUTION

(75) Inventors: Masahiro Endo, Tokorozawa (JP); Yoshiaki Kurokawa, Chiba (JP); Masahiro Ueno, Iruma (JP); Takaya Tanabe, Tokorozawa (JP); Manabu Yamamoto, Saitama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 871 days.

(21) Appl. No.: 10/229,521

(22) Filed: Aug. 28, 2002

(65) Prior Publication Data

US 2003/0044084 A1 Mar. 6, 2003

(30) Foreign Application Priority Data

Aug. 28, 2001 (JP) ............................. P2001-258645

(51) Int. Cl.
*G06K 9/36* (2006.01)
(52) U.S. Cl. ...................... 382/291; 382/151; 382/288; 382/298; 382/299
(58) Field of Classification Search ................ 382/291, 382/199, 225, 288, 298, 299, 151
See application file for complete search history.

(56) References Cited

U.S. PATENT DOCUMENTS

| 5,751,843 | A | * | 5/1998 | Maggioni et al. | ............ 382/154 |
| 5,933,523 | A | * | 8/1999 | Drisko et al. | ............... 382/151 |
| 6,005,978 | A | * | 12/1999 | Garakani | .................... 382/218 |
| 6,842,538 | B1 | * | 1/2005 | Lee et al. | .................. 382/224 |

FOREIGN PATENT DOCUMENTS

| JP | 07-254037 | 10/1995 |
| JP | 09-081726 | 3/1997 |
| JP | 09-081729 | 3/1997 |
| JP | 10-124666 | 5/1998 |
| JP | 10-208001 | 8/1998 |

* cited by examiner

*Primary Examiner*—Bhavesh M. Mehta
*Assistant Examiner*—John Strege
(74) *Attorney, Agent, or Firm*—Brenda O. Holmes; Kilpatrick Stockton LLP (57) ABSTRACT

In a two dimensional image recording and reproducing scheme, a position of a prescribed pattern in an information recording image that contains the prescribed pattern is detected by detecting a rough position of the prescribed pattern in the information recording image in units of pixel size, and then detecting a detailed position of the prescribed pattern in the information recording image in units less than the pixel size, according to the rough position and a center of gravity of a distribution of similarities between regions in the information recording image and a reference image of the prescribed pattern.

13 Claims, 12 Drawing Sheets

☐ : BIT "0"
▨ : BIT "1"

PRESCRIBED PATTERN TO BE USED AS REFERENCE (POSITION DETECTION PATTERN)

VICINITY OF PRESCRIBED PATTERN IN SCANNED IMAGE

$$F = \sum_{i=1}^{m} |G_i - X_i| \quad \sim 95$$

$$Fs' = \frac{(n-1) \times |Gk - Xk| + |Gk - Xj|}{n} \quad \sim 96$$

$$S = \frac{|Gk - Xj| - |Gk - Xk|}{n} \quad \sim 97$$

$$Fs' = \frac{(n-2) \times |Gk - Xk| + 2 \times |Gk - Xj|}{n} \quad \sim 98$$

$$S = \frac{|Gk - Xj| - |Gk - Xk|}{n} \quad \sim 99$$

$$Fs' = \frac{(n-x) \times F(k) + x \times F(k+1)}{n}, \, 0 \leq x \leq n \quad \sim 100$$

FIG.11

$$\left.\begin{array}{l} Fs(k, 1, 0, 0) = F(k, 1), \\ Fs(k, 1, n, 0) = F(k+1, 1), \\ Fs(k, 1, 0, n) = F(k, 1+1), \\ Fs(k, 1, n, n) = F(k+1, 1+1), \end{array}\right\} 101$$

$$\left.Fs(k, 1, x, y) = \frac{(n-x)(n-y)F(k, 1) + x(n-y)F(k+1, 1) + y(n-x)F(k, 1+1) + xyF(k+1, 1+1)}{n^2}\right\} 102$$

$$0 \leq x \leq n, \, 0 \leq y \leq n$$

A : SET OF PIXELS WITH HIGH SIMILARITIES
N : NUMBER OF PIXELS CONTAINED IN SET A
Px, Py : X & Y COORDINATE VALUES OF PIXEL P
P2x, P2y : X & Y COORDINATE VALUES OF DETAILED POSITION $$P2x = \sum_{A} Px / N \quad \sim 121$$

$$P2y = \sum_{A} Py / N \quad \sim 122$$

FIG.14

A : SET OF PIXELS WITH HIGH SIMILARITIES OR SET OF ALL PIXELS
Px, Py : X & Y COORDINATE VALUES OF PIXEL P
W(P) : WEIGHT FUNCTION OF PIXEL P
P2x, P2y : X & Y COORDINATE VALUES OF DETAILED POSITION
M : TOTAL SUM OF WEIGHT FUNCTIONS OF PIXELS CONTAINED IN A $$P2x = \sum_{A} (W(P) \times Px) / M \quad \sim 131$$

$$P2y = \sum_{A} (W(P) \times Py) / M \quad \sim 132$$

$$M = \sum_{A} W(P) \quad \sim 133$$

TWO DIMENSIONAL IMAGE RECORDING AND REPRODUCING SCHEME USING SIMILARITY DISTRIBUTION

BACKGROUND OF THE INVENTION

1. Field of the Invention

The present invention relates to a two dimensional image recording and reproducing scheme to be used for the optical information recording.

2. Description of the Related Art

The known schemes for recording and reproducing information as a two dimensional image includes a QR (Quick Response) code developed by Denso corp. in 1994 and a data matrix developed by United Parcel Service Inc. in late 1980s, which are known as the two dimensional codes. The two dimensional code is a scheme for recording information in two directions, horizontal and vertical directions, which is capable of recording information in an amount that is several ten to several hundred times more than a one dimensional code such as the bar code.

The two dimensional code has extraction symbols to be used in extracting information and timing marks for indicating a position and a size of each cell. The reproduction of the information is realized by reading the image by using a scanning device such as CCD (Charge Coupled Device) camera, converting it into a binary image, detecting the extraction symbols and the timing marks, and judging which pixel on the image is black and which pixel on the image is white.

The QR code uses a method for detecting the extraction symbol that is different from the data matrix. The QR code has rectangular extraction symbols provided at three corners, and this extraction symbol is designed such that a specific pulse signal can be detected from it. This method enables the high speed extraction position detection.

On the other hand, the data matrix has an extraction symbol in a form of an L-shaped guide line, and this guide line cannot be detected by the pulse detection unlike the case of the QR code so that some software processing is required.

However, the prior art as described above has been associated with the following problems.

In the general two dimensional code of the prior art described above, a size of one pixel that expresses black or white is a far larger than a size of a pixel of the scanning device. In other words, in the case of detecting one pixel, the detection is made by a plurality of pixels of the scanning device so that it becomes easier to judge whether it is white or black and a rate of the detection error due to noises or the like is low. However, it becomes difficult to store a large amount of information within a small region, so that it is difficult to increase the storing density.

Also, in the two dimensional image with large noises such as a holographic image, a rate of a grey portion that is neither black nor white becomes large due to the poor contrast, so that it becomes very difficult to judge whether it is white or black, and it is difficult to detect the specific pulse signal such as that of the QR code.

Also, in the case of carrying out the data reading and the position detection in units of one pixel of the scanning device, when a pixel displacement occurs between pixels of the recording image and pixels of the scanning device, it is difficult to make the detailed detection and it is difficult to detect the position accurately because the position detection can only be made in units of pixels.

BRIEF SUMMARY OF THE INVENTION

It is therefore an object of the present invention to provide a two dimensional image recording and reproducing scheme capable of storing and reproducing two dimensional images with large noises that are difficult to handle by the schemes such as QR code and data matrix, at high density and efficiently.

According to one aspect of the present invention there is provided a method for detecting a position of a prescribed pattern in an information recording image that contains the prescribed pattern, comprising the steps of:

(a) detecting a rough position of the prescribed pattern in the information recording image in units of pixel size; and (b) detecting a detailed position of the prescribed pattern in the information recording image in units less than the pixel size, according to the rough position detected by the step (a) and a center of gravity of a distribution of similarities between regions in the information recording image and a reference image of the prescribed pattern.

According to another aspect of the present invention there is provided an apparatus for detecting a position of a prescribed pattern in an information recording image that contains the prescribed pattern, comprising: a rough position detection unit configured to detect a rough position of the prescribed pattern in the information recording image in units of pixel size; and a detailed position detection unit configured to detect a detailed position of the prescribed pattern in the information recording image in units less than the pixel size, according to the rough position detected by the rough position detection unit and a center of gravity of a distribution of similarities between regions in the information recording image and a reference image of the prescribed pattern.

According to another aspect of the present invention there is provided a computer usable medium having computer readable program codes embodied therein for causing a computer to function as an apparatus for detecting a position of a prescribed pattern in an information recording image that contains the prescribed pattern, the computer readable program codes include: a first computer readable program code for causing said computer to detect a rough position of the prescribed pattern in the information recording image in units of pixel size; and a second readable program code for causing said computer to detect a detailed position of the prescribed pattern in the information recording image in units less than the pixel size, according to the rough position detected by the rough position detection unit and a center of gravity of a distribution of similarities between regions in the information recording image and a reference image of the prescribed pattern.

Other features and advantages of the present invention will become apparent from the following description taken in conjunction with the accompanying drawings.

DETAILED DESCRIPTION OF THE INVENTION

Referring now to FIG. 1 to FIG. 14, one embodiment of the two dimensional image recording and reproducing scheme according to the present invention will be described in detail.

Figure 1:
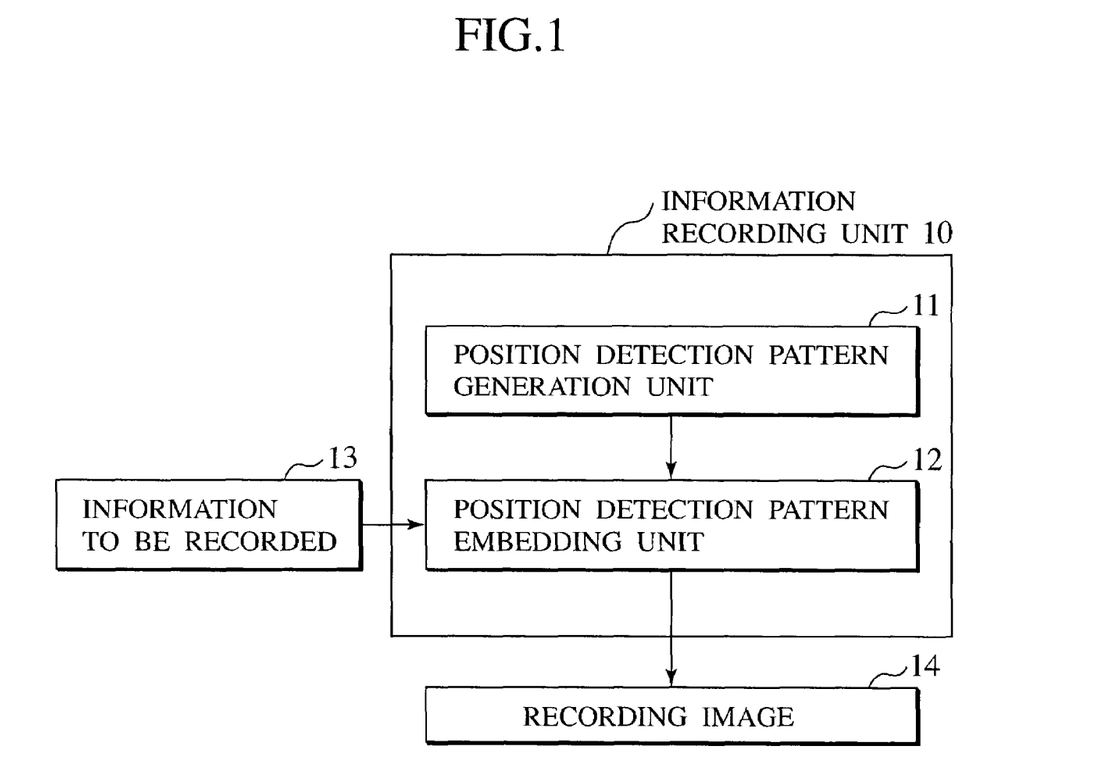
FIG. 1 is a block diagram showing an information recording unit that can be used in one embodiment of the present invention.

FIG. 1 shows an information recording unit for recording information for the purpose of detecting a position of a scanned image in the two dimensional image recording and reproducing scheme according to the present invention. This information recording unit 10 comprises a position detection pattern generation unit 11 and a position detection pattern embedding unit 12.

The position detection pattern generation unit 11 generates a prescribed pattern necessary in carrying out the position detection, and the position detection pattern embedding unit 12 embeds the prescribed pattern generated by the position detection pattern embedding unit 12 into an information to be recorded 13 to produce a recording image 14.

In further detail, each element constituting the information recording unit 10 operates as follows.

Figure 3:
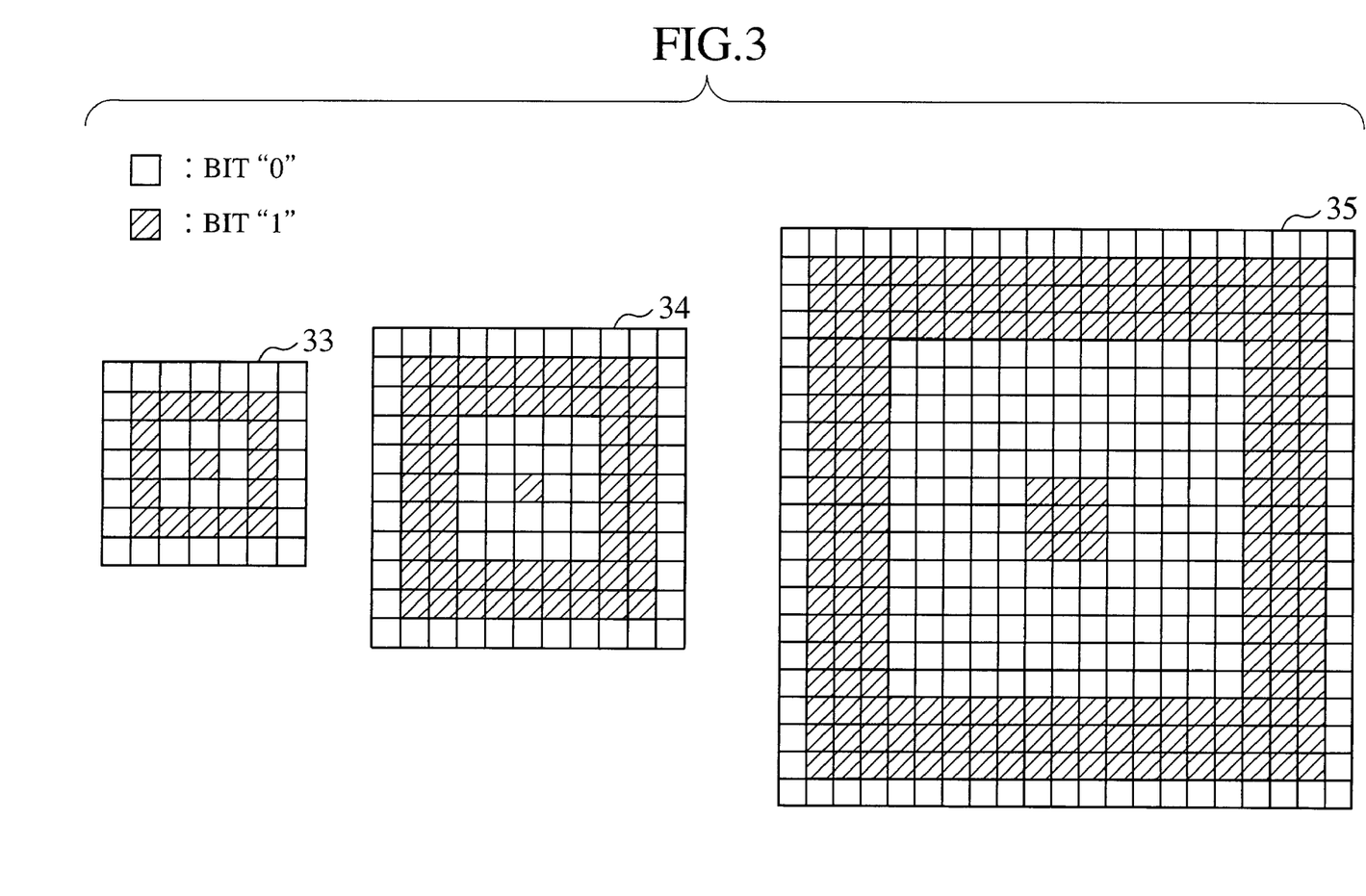
FIG. 3 is a diagram showing three examples of a position detection pattern that can be used in one embodiment of the present invention.

The position detection pattern generation unit 11 generates a prescribed pattern (position detection pattern) necessary in carrying out the position detection. FIG. 3 shows examples of the position detection pattern. Using a bit "0" represented by white (blank) square and a bit "1" represented by black (shaded) square, a position detection pattern 33 is formed as shown in FIG. 3 in which squares are arranged in an order of "1" (black), "0" (white), "1" (black), 0 (white) from the center. Here, "0" and "1" are represented by white and black as values that have significance, so that the logic may be inverted, or other values such as "0" and "255" may be used. Thus, "0" and "1" can be interchanged such that the position detection pattern has squares arranged in an order of "0", "1", "0", "1" from the center, or such that the bit "0" is represented by black and the bit "1" is represented by white.

It is also possible to change the number of consecutive "0"s or "1"s as in a position detection pattern 34 or a position detection pattern 35 shown in FIG. 3. For example, in the position detection pattern 35, two pixels representing "1", five pixels representing "0", three pixels representing "1", and one pixel representing "0" are arranged from the center. Here, the number of pixels can be set arbitrarily according to the size of the image to be handled or the recording and reproducing mechanism, but the excessively large number of pixels will reduces the recording region and thereby reduces the recording density. Even in the case of using a small position detection pattern such as the position detection pattern 33, the position detection can be realized by a rough position detection unit and a detailed position detection unit to be described below, so that the position detection pattern is determined according to the position detection precision and the recording region.

Figure 4:
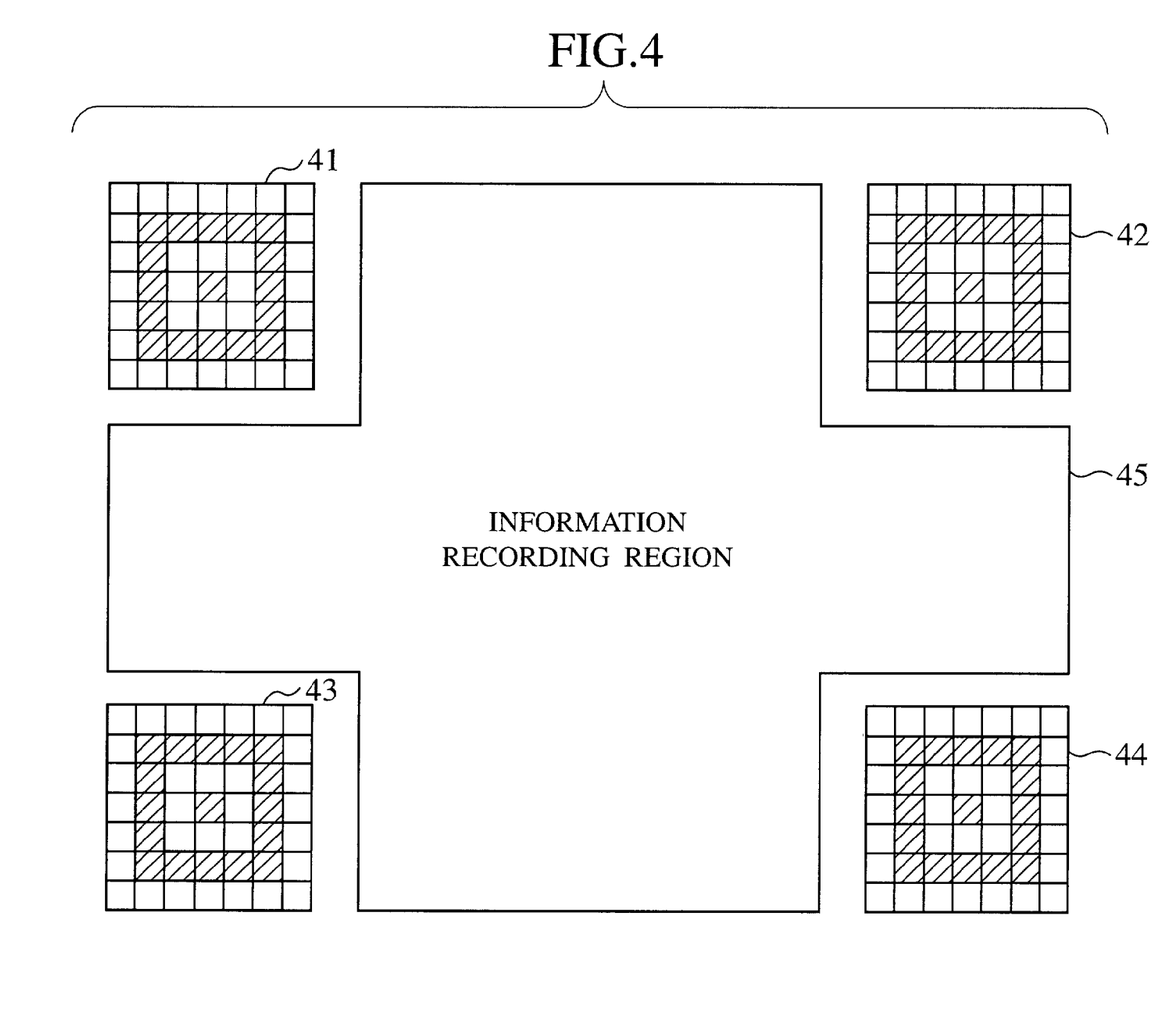
FIG. 4 is a diagram showing an example of a recording image with position detection patterns embedded that can be used in one embodiment of the present invention.

The position detection pattern embedding unit 12 embeds the position detection pattern into the information to be recorded 13 to produce the recording image 14. FIG. 4 shows and exemplary way of embedding the position detection patterns, where the position detection patterns 41 to 44 are embedded at four corners in order to detect positions of the four corners. The information to be recorded is recorded in an information recording region 45. The position detection patterns 41 to 44 and the information recording region 45 as a whole define the recording image. Note that the position detection patterns can be embedded as many as necessary at any desired positions according to the size and the shape of the recording region.

Figure 2:
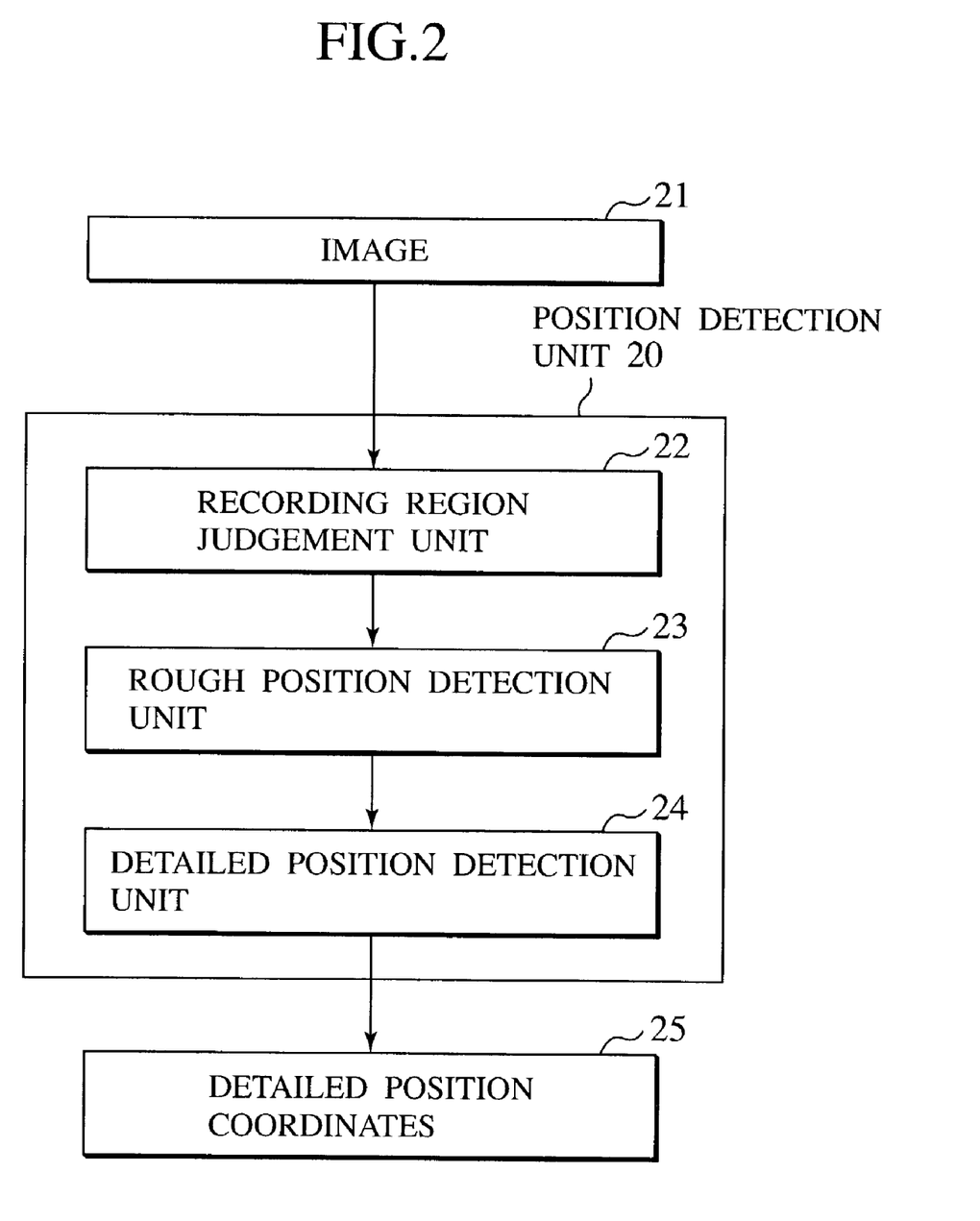
FIG. 2 is a block diagram showing a position detection unit that can be used in one embodiment of the present invention.

Next, FIG. 2 shows a position detection unit for detecting a position of a scanned image in the two dimensional image recording and reproducing scheme according to the present invention. This position detection unit 20 comprises a recording region judgement unit 22, a rough position detection unit 23, and a detailed position detection unit 24, where an image 21 that is a scanned image obtained by scanning the image in which the prescribed pattern for the position detection is embedded is inputted, and detailed position coordinates 25 are outputted.

Figure 5:
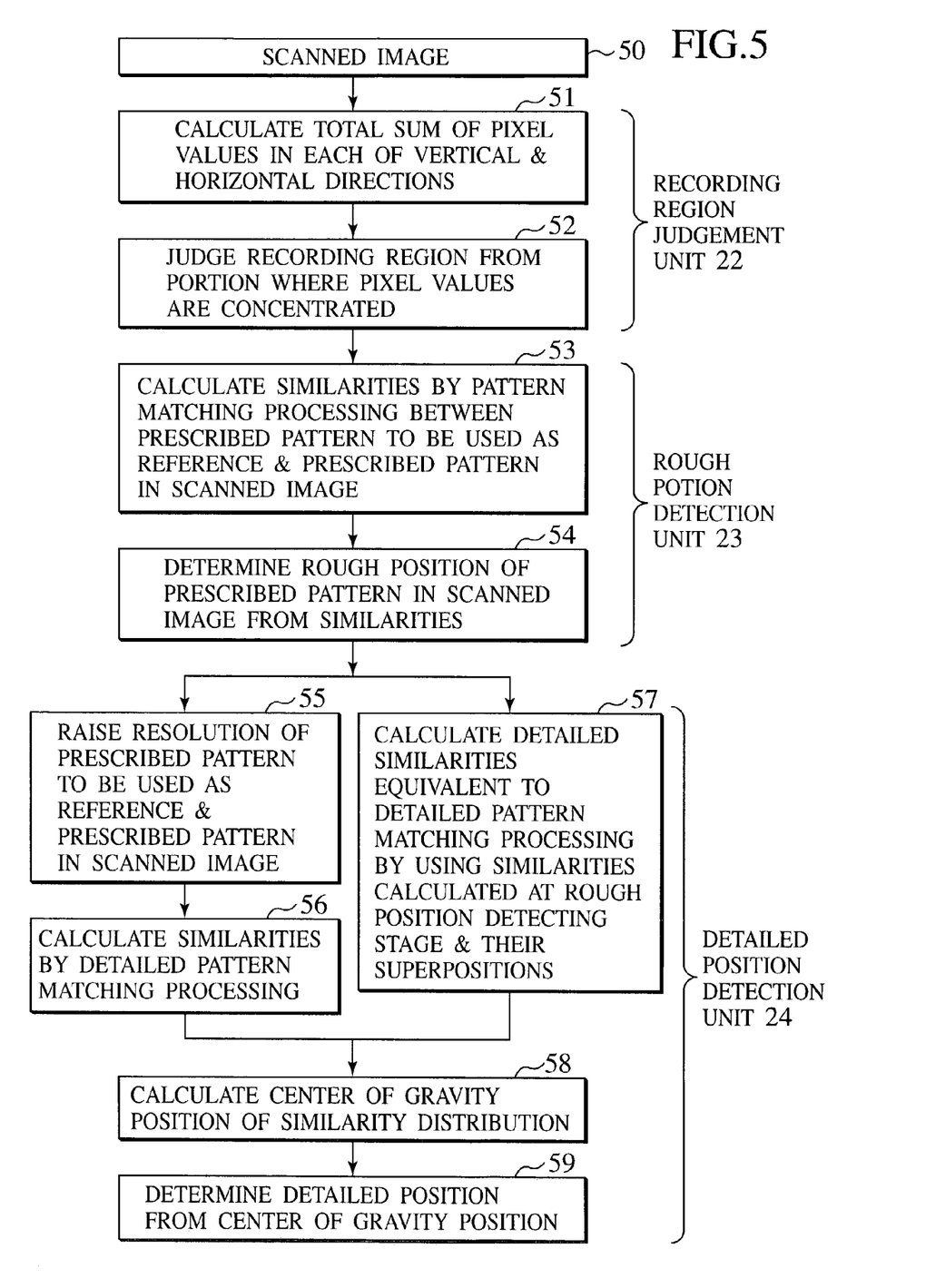
FIG. 5 is a flow chart for a processing by the position detection unit of FIG. 2.

FIG. 5 shows a flow of the processing by the position detection unit 20. With respect to the scanned image 50 entered, the recording region judgement unit 22 calculates a total sum of pixel values in each of vertical and horizontal directions (step 51), and judges and extracts the recording region as a portion where pixel values are concentrated (step 52).

Then, the rough position detection unit 23 calculates similarities between a prescribed pattern in the recording region of the scanned image and a prescribed pattern (position detection pattern) to be used as reference that is embedded for the purpose of the position detection (step 53), and determines a rough position of the prescribed pattern in the scanned image as the pixels with the highest similarities (step 54).

Then, the detailed position detection unit 24 artificially raises the image resolution of the position detection pattern and the prescribed pattern in the scanned image (step 55) and calculate similarities by carrying out the detailed pattern matching processing (step 56), or calculates similarities equivalent to the detailed pattern matching processing by using similarities calculated at the rough position detecting stage and their superpositions (step 57).

Then, the detailed position detection unit 24 calculates a center of gravity position of a similarity distribution by using similarities calculated by the steps 55 and 56 or the step 57 (step 58), and determines the detailed position of the prescribed pattern in the scanned image from the center of gravity position (step 59).

In further detail, each element constituting the position detection unit 20 operates as follows.

Figure 6:
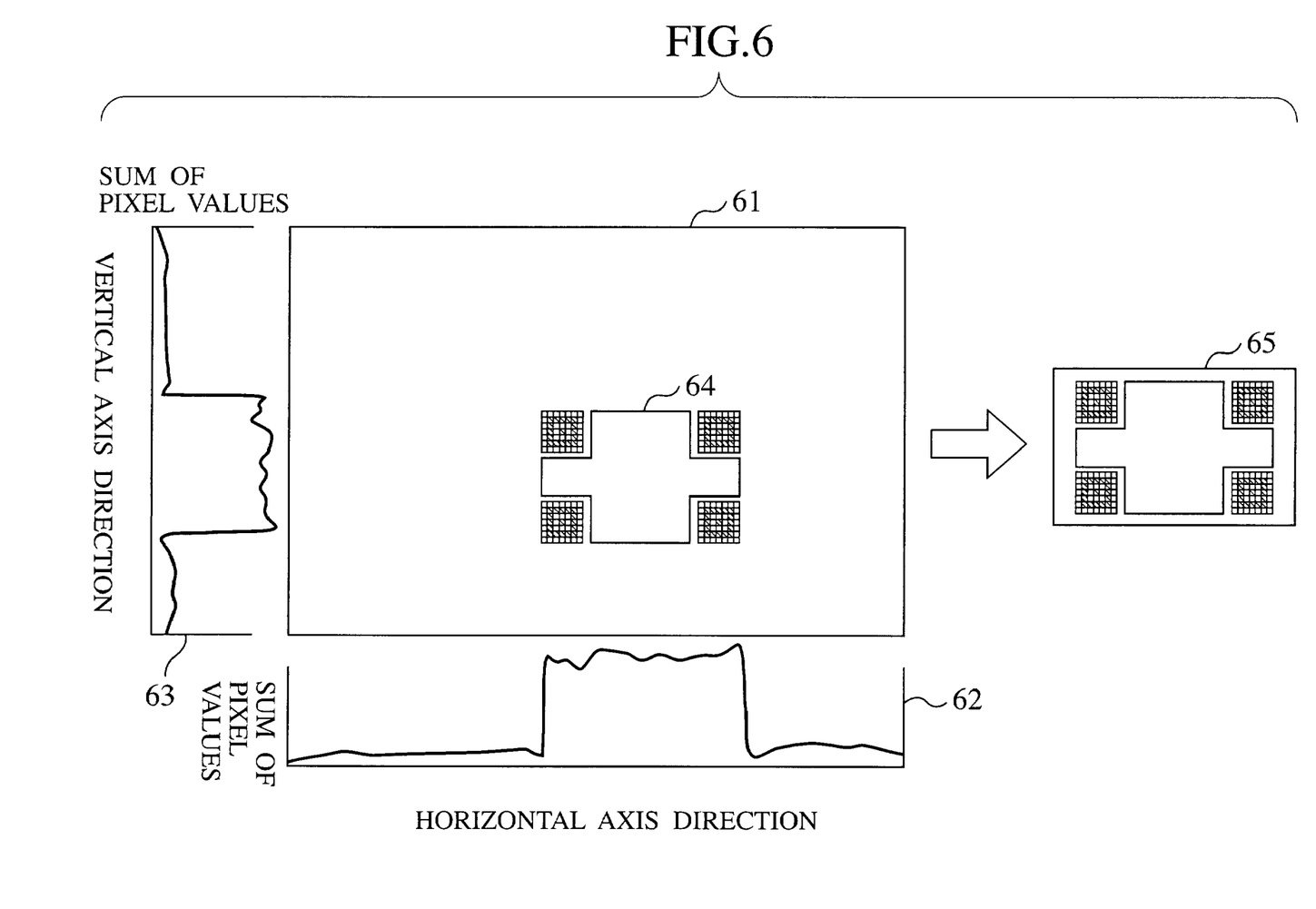
FIG. 6 is a diagram for explaining an exemplary process of judging a recording region by the position detection unit of FIG. 2.

The recording region judgement unit 22 detects and extracts the recording region from the scanned image obtained by a scanning device for scanning the recording image or the like. FIG. 6 shows a process for detecting the recording region, where a scanned image 61 obtained by a scanning device or the like contains a recording region 64 of the recording image. The recording region judgement unit 22 detects and extracts the recording region 64 from the scanned image 61.

First, the horizontal direction of the scanned image 61 is considered. With respect to each pixel in the horizontal direction, a sum 62 of the pixel values of all the pixels in the vertical directions is obtained. Next, the vertical direction of the scanned image 61 is considered. With respect to each pixel in the vertical direction, a sum 63 of the pixel values of all the pixels in the horizontal direction is obtained. Then, a portion where the sum 62 of the pixel values in the horizontal direction and the sum 63 of the pixel values in the vertical direction are concentrating is judged as the recording region 64, and a region 65 surrounding that portion is extracted.

Figure 7:
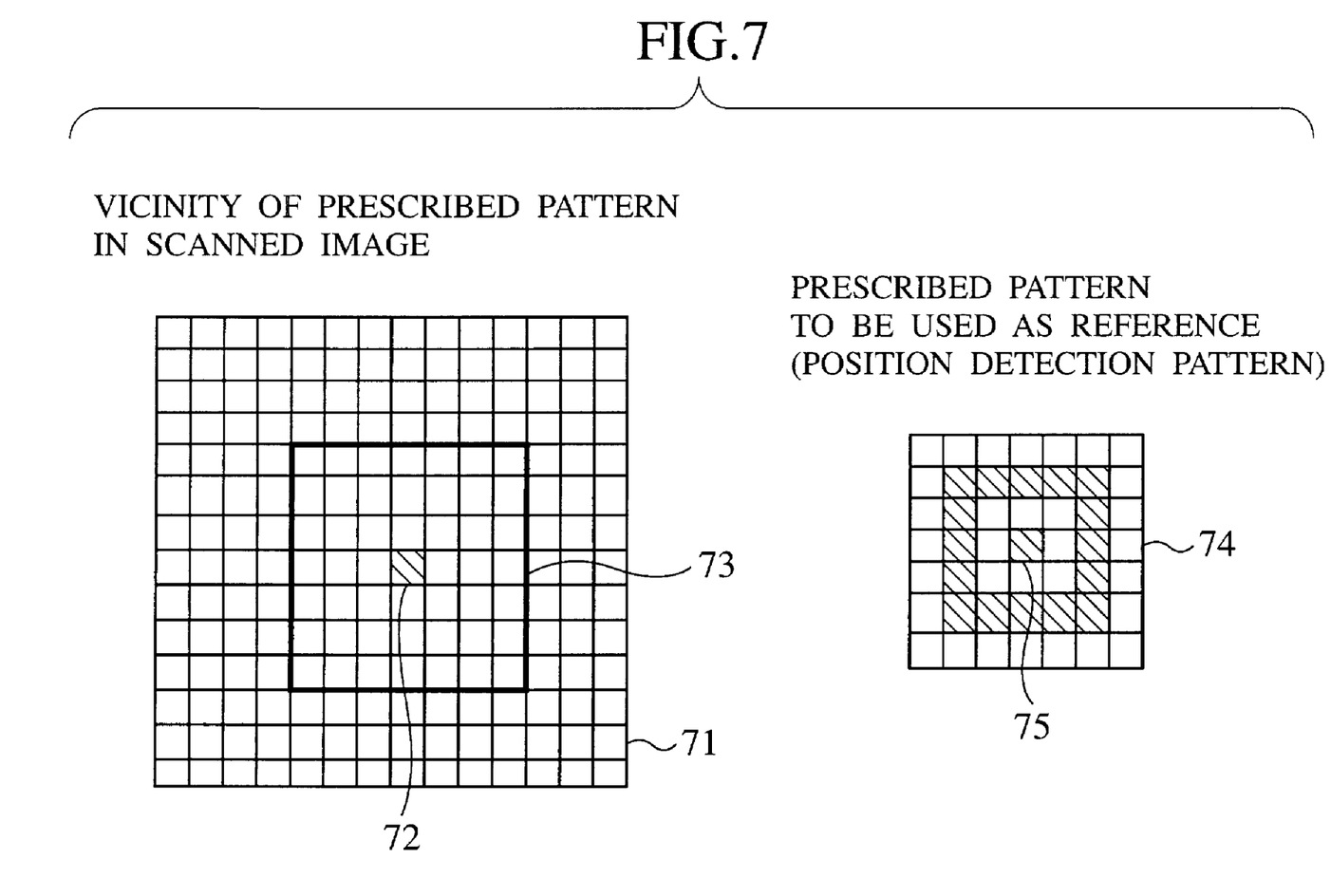
FIG. 7 is a diagram for explaining an exemplary pattern matching processing by the position detection unit of FIG. 2.

The rough position detection unit 23 carries out the pattern matching processing by using a prescribed pattern (position detection pattern) to be used as reference that is embedded for the purpose of the position detection with respect to the image extracted by the recording region judgement unit 22, and detects a position where the similarity with respect to each embedded prescribed pattern is highest as a rough position of the prescribed pattern. FIG. 7 shows this pattern matching processing, where an image 71 represents a vicinity of the prescribed pattern in the recording region of the scanned image, and an image 74 represents the position detection pattern.

In the pattern matching processing, the similarity with the position detection pattern 74 is calculated for every pixel in the recording region or every potentially candidate pixel. Here, two types of the pattern matching processing method will be described.

In the case of calculating the similarity with the position detection pattern 74 for a pixel 72 in the recording region image 71, if the position to be detected is assumed to be a central pixel 75 of the position detection pattern 74 (although the position to be detected need not be located at a center of the position detection pattern 74), the pixel 72 of the recording region image 71 and the pixel 75 of the position detection pattern 74 are set to coincide, and the pattern matching processing is carried out between the recording image region 71 and the position detection pattern 74.

In the first method, a difference between pixel values of corresponding pixels of the recording region image 71 and the position detection pattern 74 is calculated, the absolute values of the pixel value differences obtained for all pixels within a region 73 corresponding to the position detection pattern 74 are summed, and the obtained value is set as the similarity of the pixel 72. If the region 73 and the position detection pattern 74 coincide completely, the similarity will be zero.

In the second method, a product of pixel values of corresponding pixels of the recording region image 71 and the position detection pattern 74 is calculated, the pixel value products obtained for all pixels within a region 73 corresponding to the position detection pattern 74 are summed, and the obtained value is set as the similarity of the pixel 72. In this case, the region 73 and the position detection pattern 74 are matching best at a pixel for which the similarity is highest.

Next, using the similarities obtained by the pattern matching processing, the pixel with the highest similarity is detected, and this pixel is set as a rough position of the prescribed pattern in the scanned image.

The detailed position detection unit 24 artificially raises the image resolution of the prescribed pattern (position detection pattern) to be used as reference and the prescribed pattern detected by the rough position detection unit 23 and calculates the similarities by carrying out the detailed pattern matching processing, or calculates similarities equivalent to the detailed pattern matching processing by using the similarities calculated at the rough position detecting stage and their superpositions. Then, the detailed position detection unit 24 calculates the center of gravity position of the similarity distribution by using the calculated similarities, and determines the detailed position of the prescribed pattern from the center of gravity position.

Here, two types of the detailed similarity calculation method will be described, along with a method for calculating the center of gravity position and determining the detailed position.

Figure 8:
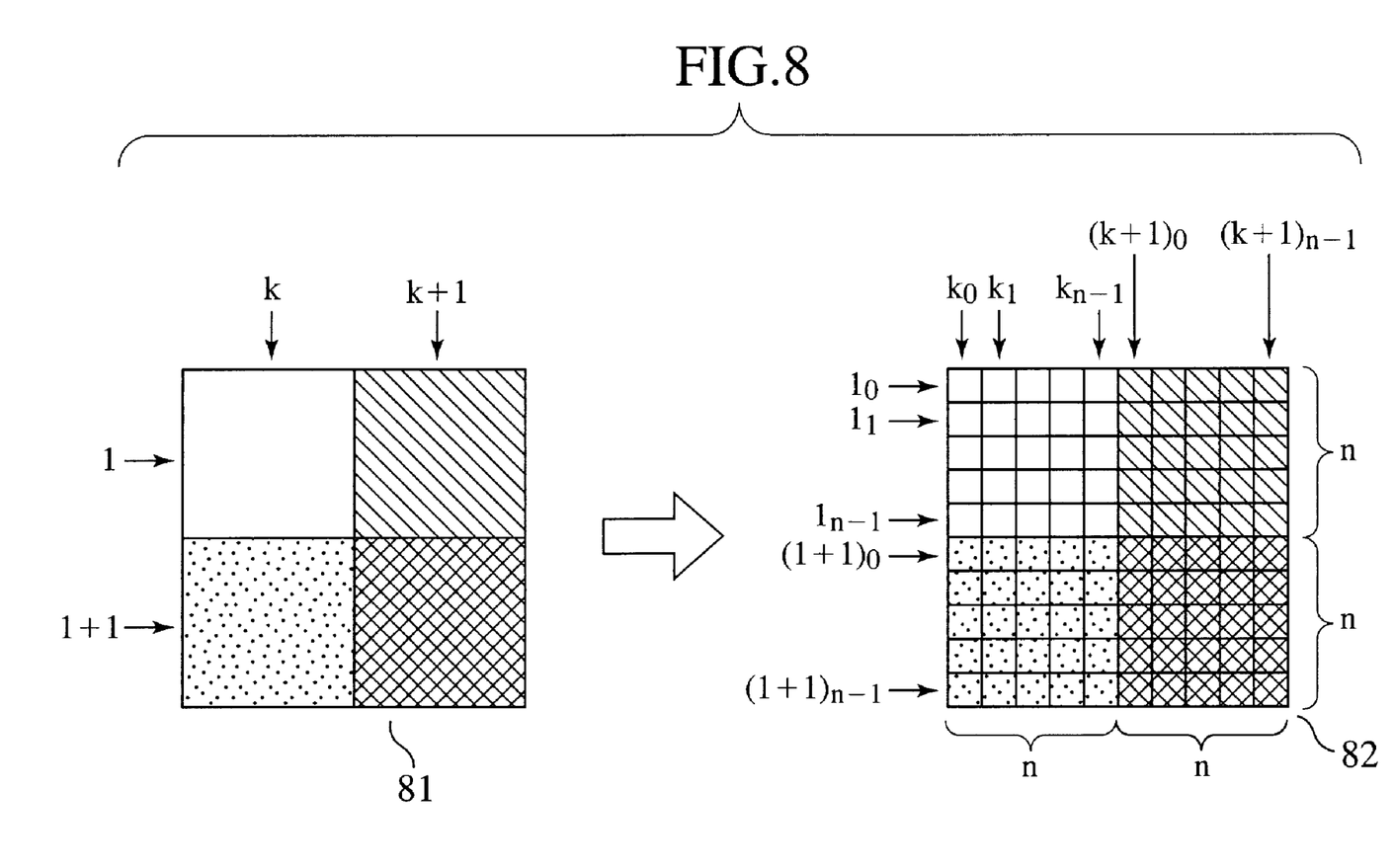
FIG. 8 is a diagram for explaining an exemplary process of artificially raising image resolution by the position detection unit of FIG. 2.

The first method for calculating the detailed similarities is as follows. First, the image resolution of the position detection pattern is raised artificially. Then, the image resolution of a vicinity of the rough position detected by the rough position detection unit 23 is artificially raised. A region in which the resolution is to be raised is defined by pixels that can be candidates in the detailed position detection. FIG. 8 shows a process of artificially raising the image resolution. Here, two by two image region of the position detection pattern for which the image resolution is to be raised will be considered. In the case of raising the resolution of each pixel n times, each pixel is subdivided into n by n sub-regions, and these sub-regions are set as new pixels by assigning pixel values of the original pixel. In this way, an image 82 which n=5 can be obtained from an image 81 by raising the image resolution.

The image resolution of a vicinity of the rough position of the recording region image (a region to be used in the detailed position detection) is also raised similarly.

Then, the pattern matching processing similar to that of the rough position detection unit 23 is carried out by using the resolution raised position detection pattern with respect to the resolution raised recording region image, and the obtained result is set as the similarity after the resolution raising.

Here, the region to be used in the detailed position detection is a region that is necessary for calculating the similarities by using the resolution raised position detection pattern with respect to a region to be used in the detailed position detection centered around the rough position. For example, in the case of carrying out the detailed position detection from a region of 3 by 3 pixels centered around the rough position by using the position detection pattern of 7 by 7 pixels, a region of 9 by 9 pixels will be necessary.

Next, the second method for calculating the detailed similarities will be described. In this method, the pattern matching processing result is calculated artificially on a basis of the similarities calculated by the rough position detection unit 23.

Figure 9:
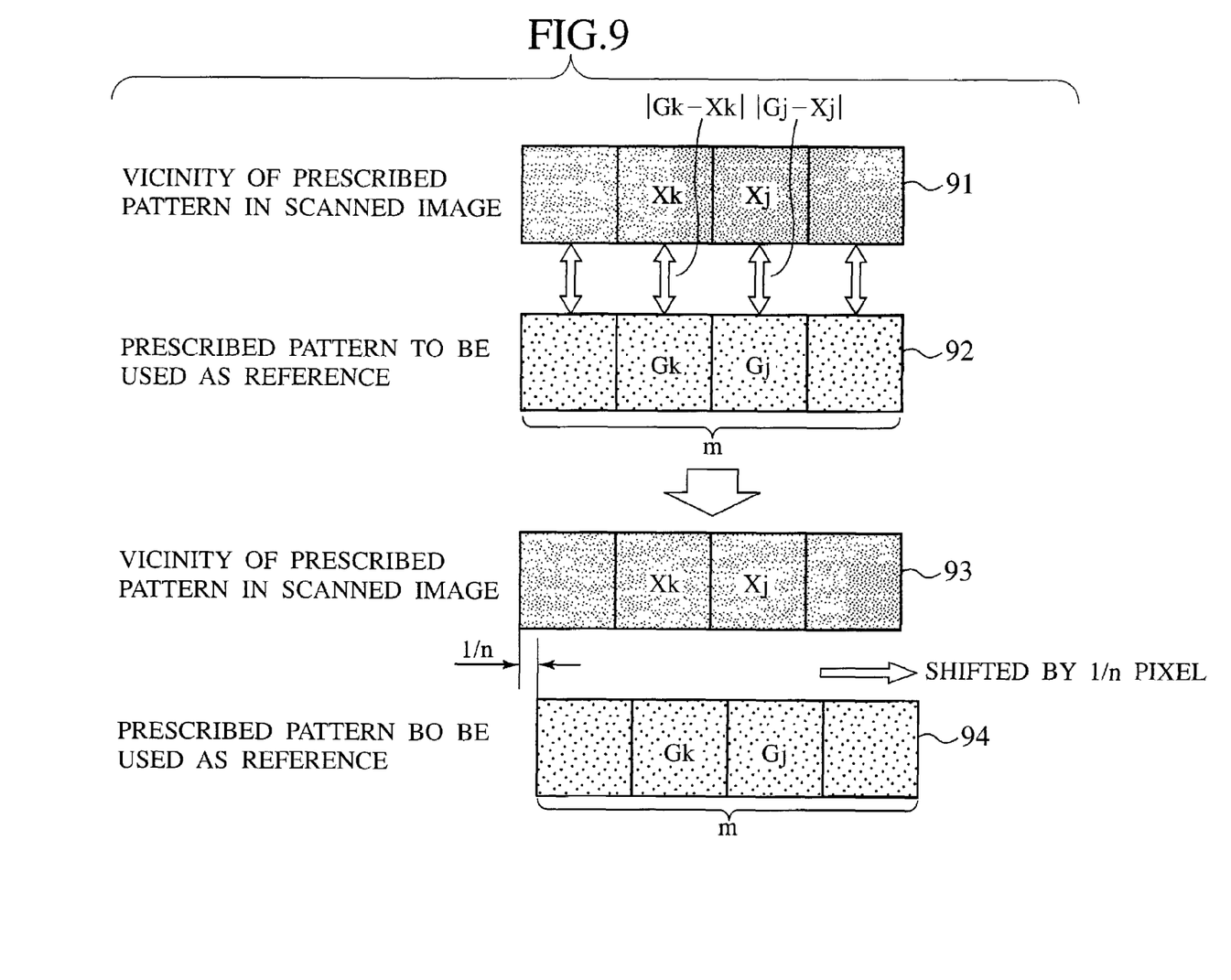
FIG. 9 is a diagram for explaining a second method for calculating detailed similarities according to one embodiment of the present invention, for one dimensional case.

For the sake of simplicity, one dimensional case is described first. FIG. 9 shows a processing in this one dimensional case. Here, the number of pixels of the position detection pattern is denoted as m, the value of each pixel is denoted as Gi, and a value of corresponding pixel in the recording region image is denoted as Xi. If the positions of each pixel of the position detection pattern and each pixel of the recording region image are coinciding, the pattern matching processing result F can be expressed as an equation 95 shown in FIG. 10.

Then, differences between F and the pattern matching results Fs obtained by sequentially shifting the position detection pattern in units of 1/n pixel from that position towards right will be considered. The result for the entire image can be obtained by summing the result for each pixel, so that the result Fs' for one pixel will be considered. Here, a value of that pixel in the recording region image 91 is denoted as Xj, a value of a left neighbor pixel of that pixel is denoted as Xk, a value of that pixel in the position detection pattern 92 is denoted as Gj, and a value of a left neighbor pixel of that pixel is denoted as Gk.

In the following, the case of calculating the rough similarities by the first method of the pattern matching processing will be described by using concrete equations. The pattern matching processing result Fs' with respect to a left neighbor pixel is |Gk−Xk|. When the position detection pattern 94 is shifted by 1/n towards right with respect to the recording image region 93, only 1/n part of the pixel k of the position detection pattern becomes |Gk−Xj| while the other part remains unchanged, so that the pattern matching processing result is expressed as an equation 96 shown in FIG. 10.

Figure 10:
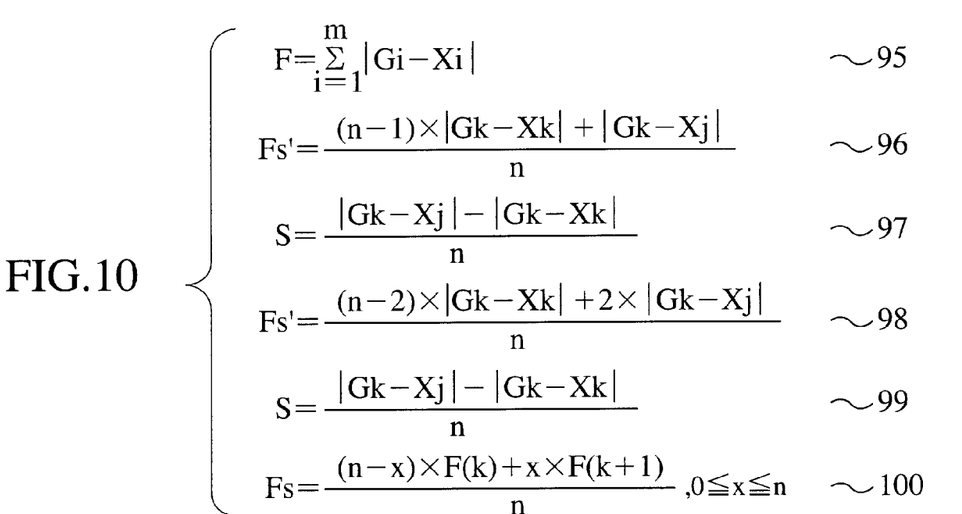
FIG. 10 is a diagram showing equations used in the second method for calculating detailed similarities according to one embodiment of the present invention, for one dimensional case.
Figure 11:
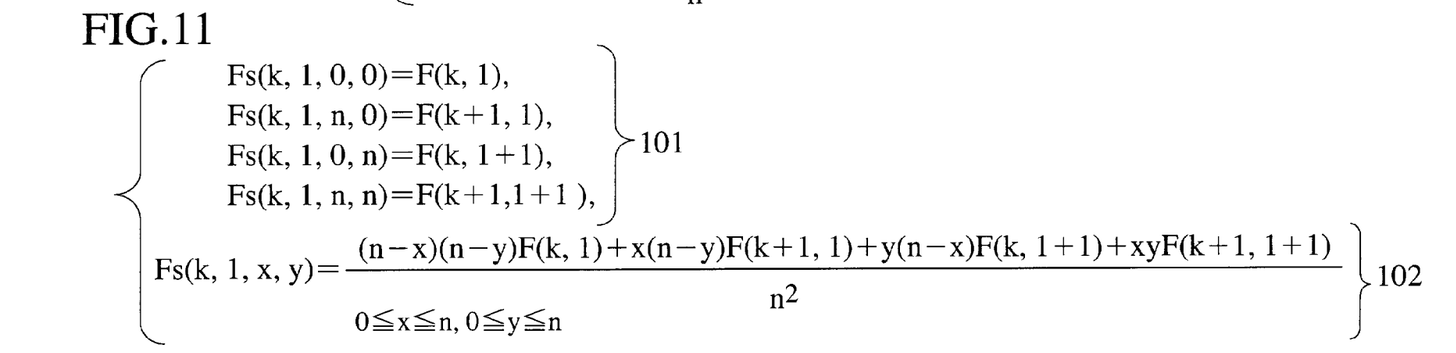
FIG. 11 is a diagram showing equations used in the second method for calculating detailed similarities according to one embodiment of the present invention, for two dimensional case.

Consequently, the difference S from the result before the shifting is expressed as an equation 97 shown in FIG. 10.

When the position detection pattern is further shifted by 1/n towards right (shifted by 2/n overall), only 1/n part of the pixel k of the position detection pattern newly becomes |Gk−Xj| while the other part remains unchanged, so that the pattern matching processing result is expressed as an equation 98 shown in FIG. 10, and the difference S from the result before the shifting is expressed as an equation 99 shown in FIG. 10.

This difference S after 2/n shift is the same as the difference S after 1/n shift. In other words, the pattern matching processing results Fs' for each pixel obtained by sequentially shifting in units of 1/n pixel will form an arithmetical progression.

The result Fs for the entire image is a sum of the result Fs' for each pixel, so that the results Fs of the entire pattern matching processing will also form an arithmetical progression. Then, the result after shifting for n times completely coincides with the result for the neighbor pixel, so that it coincides with the pattern matching processing result in the case where the position detection pattern is displaced for one pixel towards right from the recording region image.

When the pattern matching processing result at one position is denoted as F(k) and the pattern matching processing result at its right neighbor is denoted as F(k+1), the pattern matching processing result after shifting x times between these two can be expressed as an equation 100 shown in FIG. 10. Here, x is an integer satisfying the relationship $0 \leq x \leq n$. The equation 100 indicates that the pattern matching processing result after raising the resolution of pixels, i.e., the detailed similarities Fs, is obtained by linearly interpolating the pattern matching processing result before raising the resolution of pixels, i.e., the rough similarities F.

Thus, the pattern matching processing result after the resolution raising can be obtained artificially by using the pattern matching processing result before the resolution raising. This holds true for the shifting towards left, the shifting upwards, and the shifting downwards, so that in the case of shifting two dimensionally (in the left right direction and the up down direction), the result can be calculated as superpositions of these results.

In the above, the case of using the pattern matching processing result obtained by the first method of the pattern matching processing is described, but in the case of using the pattern matching processing result obtained by the second method of the pattern matching processing, it can be derived by the same consideration that it suffices to replace F(k) and F(k+1) in the equation 100 with the similarities obtained by the second method of the pattern matching processing.

Next, the pattern matching processing result in the case of shifting two dimensionally will be described by assuming that the resolution is raised in the manner shown in FIG. 8. Here, the coordinates of the pixel in the recording region image are denoted as (k, l), and the similarity calculated by the rough position detection unit 23 at the pixel (k, l) is denoted as F(k, l). This similarity can be one that is obtained by either the first method or the second method of the pattern matching processing.

It is also assumed that the resolution is raised n times, the coordinates (Kx, ly) is denoted as (k, l, x, y), and the detailed pattern matching processing result is denoted as Fs(k, l, x, y), where x ($0 \leq x \leq n$) and y ($0 \leq y \leq n$) represent the amount of shifting of pixels. In this case, relationships of equations 101 shown in FIG. 11 hold, and the pattern matching processing result in the case of shifting for x/n pixels in the horizontal direction and y/n pixels in the vertical direction from the pixel at the coordinates (k, l) in the resolution raised image, i.e., the similarity after raising the resolution, can be calculated by an equation 102 shown in FIG. 11. The equation 102 indicates that the pattern matching processing result after raising the resolution of pixels, i.e., the detailed similarities Fs, is obtained by linearly interpolating the pattern matching processing result before raising the resolution of pixels, i.e., the rough similarities F, even in the two dimensional case, similarly as in the one dimensional case.

The second method for calculating the detailed similarities described here is capable of obtaining the same calculation result as the first method, while also reducing the amount of calculations drastically compared with the first method, so that it is advantageous in making the processing fast.

Figure 12:
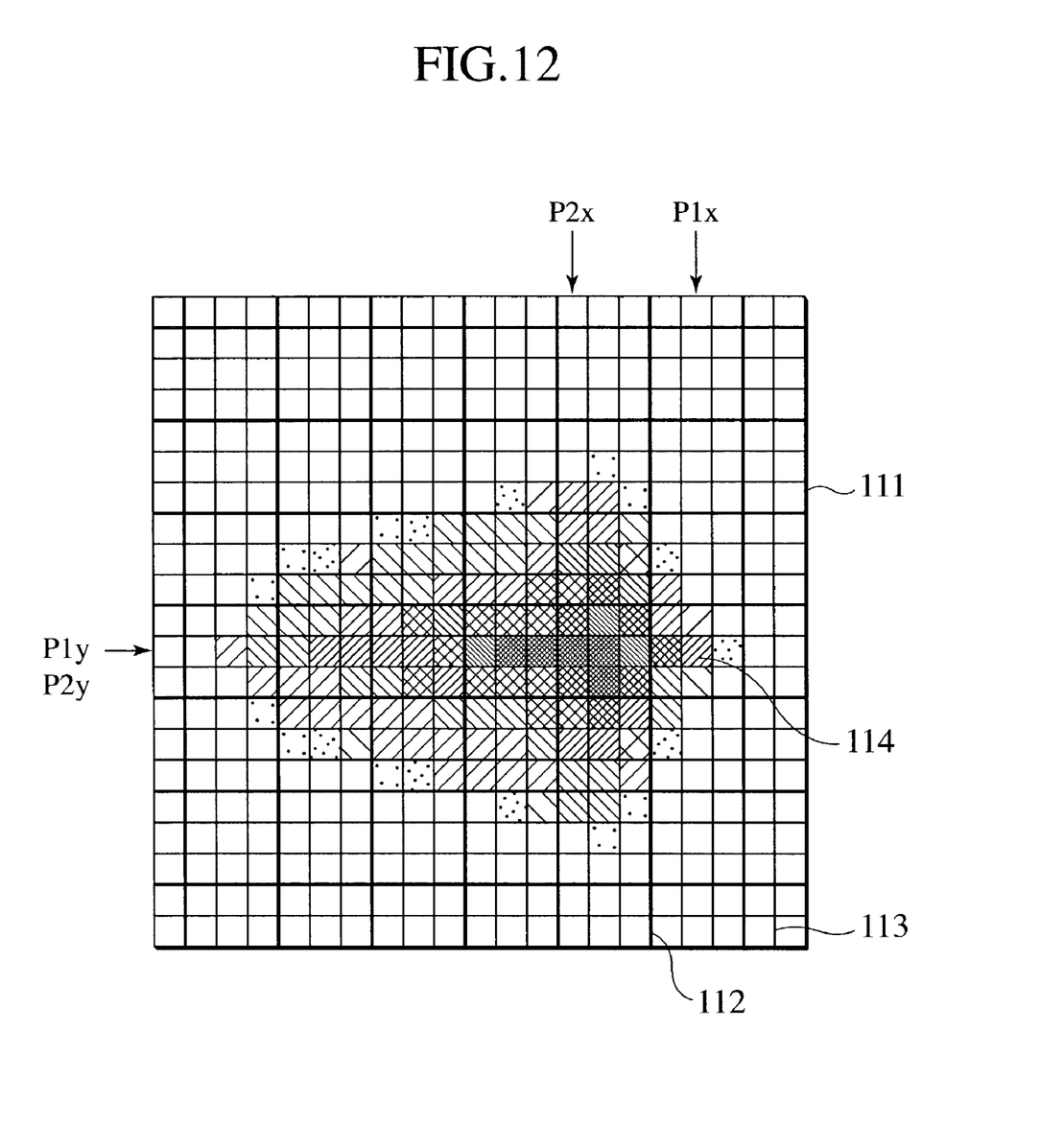
FIG. 12 is a diagram showing an example of a similarity distribution that can be used by the position detection unit of FIG. 2 in one embodiment of the present invention.

By the first method or the second method for calculating the detailed similarities, a similarity distribution image 111 representing a distribution of the detailed similarities as shown in FIG. 12 can be obtained. This similarity distribution image 111 is an exemplary case of calculating the rough similarities by using the first method of the pattern matching processing. Here, solid lines 112 indicate boundaries of the original pixels and dotted lines 113 indicate boundaries of pixels after the resolution raising. FIG. 12 shows an exemplary case of n=3 in the resolution raising, and pixel values 114 representing the similarities are expressed by the grey scale in 256 steps ranging from 0 for black to 255 for white. Namely, the pixels with a tone closest to black are pixels with highest similarities.

Note that, in the case where the rough similarities are calculated by using the second method of the pattern matching processing, a relationship among pixel values represented by black and white is reversed from this example, but the following processing is equally applicable. In carrying out the detailed position detection in practice, there is no need to form the image of the similarities or use the grey scale in 256 steps, and it suffices to handle the similarities as numerical values.

In this exemplary case, the pixel at the coordinates (P1$x$, P1$y$) has the highest similarity. Here, due to the artificial raising of the image resolution, the noises in the images, and the pixel displacement between pixels of the recording image and pixels of the scanning device, the coordinates (P1$x$, P1$y$) cannot be considered as the accurate detailed position that is desired to be obtained. For this reason, the true recording position is estimated by obtaining a center of gravity of the similarities from the similarity distribution image 111.

Figure 13:
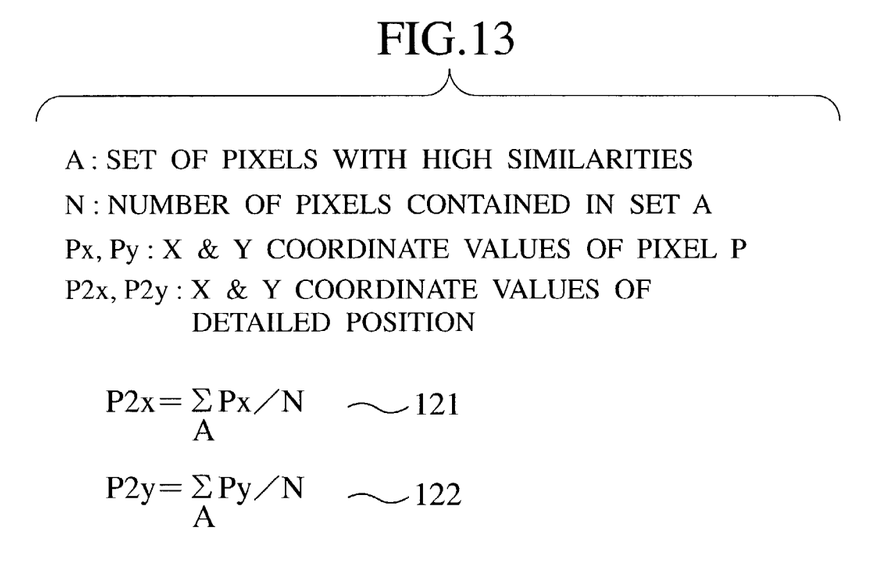
FIG. 13 is a diagram showing equations used in the first method for calculating a center of gravity of a similarity distribution according to one embodiment of the present invention.
Figure 14:
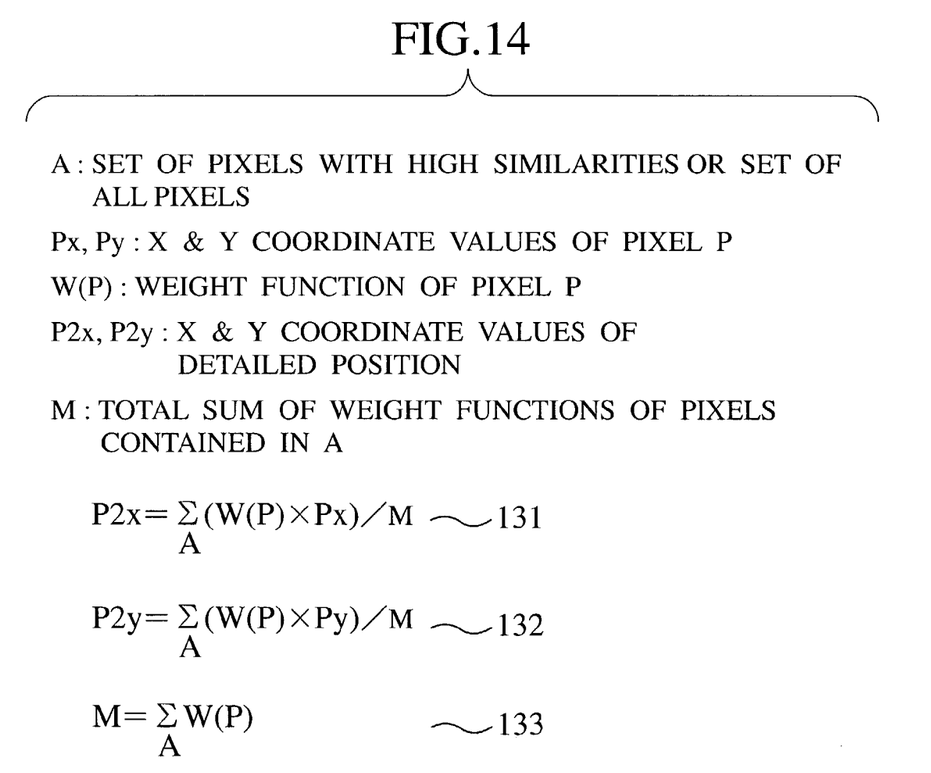
FIG. 14 is a diagram showing equations used in the second method for calculating a center of gravity of a similarity distribution according to one embodiment of the present invention.

More specifically, this is done by using equations 121 and 122 shown in FIG. 13, or equations 131, 132 and 133 shown in FIG. 14. In the case of FIG. 13, A denotes a set of pixels with high similarities (set of detailed position candidates), N denotes the number of pixels contained in A, Px denotes an X coordinate value of a pixel P, and Py denotes a Y coordinate value of a pixel P. In this case, the detected position (P2$x$, P2$y$) can be calculated by the equations 121 and 122 shown in FIG. 13.

In the case of FIG. 14, A denotes a set of pixels with high similarities or a set of all pixels, W(P) denotes the weight function of a pixel P, Px and Py respectively denote X and Y coordinate values of a pixel P, and M denotes a total sum of the weight functions W(P) of pixels contained in A. In this case, the detected position (P2$x$, P2$y$) can be calculated by the equations 131 and 132 shown in FIG. 14.

The weight function W(P) used in this calculation can be set as a complement of the detailed similarity Fs(P) of the resolution raised pixel P in the case where the rough similarities are calculated by using the first method of the pattern matching processing, for example, or as the detailed similarity Fs(P) itself in the case where the rough similarities are calculated by using the second method of the pattern matching processing, for example.

Finally, the coordinates (P2$x$, P2$y$) obtained by the equations of FIG. 13 or FIG. 14 are detected as the detailed position of the prescribed pattern in the scanned image.

The major features of the embodiment of the present invention described above are the following. At a time of recording, with respect to the two dimensional image for the information to be recorded, rectangular region images having a pattern like "1, 0, 1" from the center outwards are arranged at four corners. At a time of the position detection, with respect to the two dimensional image containing the recording region, the total sum of the pixel values of the pixels is calculated for each of the vertical direction and the horizontal direction, the recording region is judged from a level of concentration of the pixel values and extracted, a rough recording position is detected by carrying out the pattern matching by using the position detection information image having a pattern like "1, 0, 1", the detailed pattern matching processing is carried out by enlarging the number of pixels with respect to a vicinity of the rough recording position, and then the recording position is calculated and detected from a center of gravity of a distribution of some candidates with higher matching results.

Also, in the conventional QR code, the specific pulse signal of the extraction symbol is detected, whereas the present invention carries out the detection of the recording position by the pattern matching processing in three stages.

Also, in the pattern matching processing, the processing is carried out in multiple stages, the recording position is calculated from a distribution of candidates and detected in analog-like manner, unlike the position detection method of the other codes.

The two dimensional image to be recorded has the position detection information image embedded therein for the purpose of the position detection, and the position detection is carried out by applying the pattern matching processing for it, so that it is possible to realize the position detection that is robust against noises or distortions of the images, compared with the method for carrying out the position detection by detecting the pulse signal.

Also, by the use of the pattern matching processing in multiple stages for the detailed detection and the calculation of the final detected position from a center of gravity of a distribution of candidates for the detected positions, it is possible to realize the position detection with high precision that is robust against noises or distortions of the images.

As described, according to the present invention, it is possible to provide a two dimensional image recording and reproducing scheme which is capable of detecting the position of the recording region even in the case where the two dimensional image that records the information has large noises or the case where the image for the position detection is made small in order to increase the recording density, and which is capable of detecting the accurate recording position from a center of gravity of a distribution of pixels that are candidates for the recording position even in the case where there is a pixel displacement between pixels of the recording image and pixels of the scanning device.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the position detection unit of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for detecting a position of a prescribed pattern in an information recording image that contains the prescribed pattern, comprising the steps of:

(a) detecting a rough position of the prescribed pattern in the information recording image in units of pixel size; and (b) detecting a detailed position of the prescribed pattern in the information recording image in units less than the pixel size, according to the rough position detected by the step (a) and a center of gravity of a distribution of similarities between regions in the information recording image and a reference image of the prescribed pattern.

2. The method of claim 1, wherein the step (a) further comprises the steps of:

(a1) calculating rough similarities between regions in the information recording image and the reference image of the prescribed pattern, by carrying out a pattern matching processing; and (a2) determining the rough position of the prescribed pattern in the information recording image according to the rough similarities obtained by the step (a1).

3. The method of claim 1, wherein the step (b) further comprises the steps of:

(b1) raising resolution of the information recording image in a region around the rough position detected by the step (a) and the reference image of the prescribed pattern;

(b2) calculating detailed similarities between regions in the information recording image in raised resolution obtained by the step (b1) and the reference image of the prescribed pattern in raised resolution obtained by the step (b1), by carrying out a detailed pattern matching processing;

(b3) calculating a center of gravity position of the distribution of the detailed similarities obtained by the step (b2); and (b4) determining the detailed position of the prescribed pattern in the information recording image according to the center of gravity position obtained by the step (b3).

4. The method of claim 1, wherein the step (b) further comprises the steps of:

(b11) calculating detailed similarities between regions of the information recording image and the reference image of the prescribed pattern, by using rough similarities obtained at the step (a) by carrying out a pattern matching processing;

(b12) calculating a center of gravity position of the distribution of the detailed similarities obtained by the step (b11); and (b13) determining the detailed position of the prescribed pattern in the information recording image according to the center of gravity position obtained by the step (b12).

5. The method of claim 4, wherein the step (b11) calculates the detailed similarities by linearly interpolating the rough similarities in units less than the pixel size.

6. The method of claim 1, wherein the information recording image is contained in a scanned image, and the method further comprises the step of judging a region of the information recording image in the scanned image.

7. An apparatus for detecting a position of a prescribed pattern in an information recording image that contains the prescribed pattern, comprising:

a rough position detection unit configured to detect a rough position of the prescribed pattern in the information recording image in units of pixel size; and a detailed position detection unit configured to detect a detailed position of the prescribed pattern in the information recording image in units less than the pixel size, according to the rough position detected by the rough position detection unit and a center of gravity of a distribution of similarities between regions in the information recording image and a reference image of the prescribed pattern.

8. The apparatus of claim 7, wherein the rough position detection unit further comprises:

a similarity calculation unit configured to calculate rough similarities between regions in the information recording image and the reference image of the prescribed pattern, by carrying out a pattern matching processing; and a position determination unit configured to determine the rough position of the prescribed pattern in the information recording image according to the rough similarities obtained by the similarity calculation unit.

9. The apparatus of claim 7, wherein the detailed position detection unit further comprises:

a resolution raising unit configured to raise resolution of the information recording image in a region around the rough position detected by the rough position detection unit and the reference image of the prescribed pattern;

a similarity calculation unit configured to calculate detailed similarities between regions in the information recording image in raised resolution obtained by the resolution raising unit and the reference image of the prescribed pattern in raised resolution obtained by the resolution raising unit, by carrying out a detailed pattern matching processing;

a center of gravity calculation unit configured to calculate a center of gravity position of the distribution of the detailed similarities obtained by the similarity calculation unit; and a position determination unit configured to determine the detailed position of the prescribed pattern in the information recording image according to the center of gravity position obtained by the center of gravity calculation unit.

10. The apparatus of claim 7, wherein the detailed position detection unit further comprises:

a similarity calculation unit configured to calculate detailed similarities between regions in the information recording image and the reference image of the prescribed pattern, by using rough similarities obtained at the rough position detection unit by carrying out a pattern matching processing;

a center of gravity calculation unit configured to calculate a center of gravity position of the distribution of the detailed similarities obtained by the similarity calculation unit; and a position determination unit configured to determine the detailed position of the prescribed pattern in the information recording image according to the center of gravity position obtained by the center of gravity calculation unit.

11. The apparatus of claim 10, wherein the similarity calculation unit calculates the detailed similarities by linearly interpolating the rough similarities in units less than the pixel size.

12. The apparatus of claim 7, wherein the information recording image is contained in a scanned image, and the apparatus further comprises a region judgement unit configured to judge a region of the information recording image in the scanned image.

13. A computer usable medium having computer readable program codes embodied therein for causing a computer to function as an apparatus for detecting a position of a prescribed pattern in an information recording image that contains the prescribed pattern, the computer readable program codes include:
    a first computer readable program code for causing said computer to detect a rough position of the prescribed pattern in the information recording image in units of pixel size; and     a second readable program code for causing said computer to detect a detailed position of the prescribed pattern in the information recording image in units less than the pixel size, according to the rough position detected by the rough position detection unit and a center of gravity of a distribution of similarities between regions in the information recording image and a reference image of the prescribed pattern.

\* \* \* \* \*